US007366354B2

United States Patent
Schweid et al.

(10) Patent No.: US 7,366,354 B2
(45) Date of Patent: Apr. 29, 2008

(54) 10-BIT PER PIXEL PROCESSING USING 8-BIT RESOURCES

(75) Inventors: Stuart A. Schweid, Pittsford, NY (US); Roger L. Triplett, Penfield, NY (US); Gene M. Nitschke, Webster, NY (US); Xing Li, Webster, NY (US)

(73) Assignee: Xerox Corporation, Norwalk, CT (US)

( * ) Notice: Subject to any disclaimer, the term of this patent is extended or adjusted under 35 U.S.C. 154(b) by 771 days.

(21) Appl. No.: 10/879,026

(22) Filed: Jun. 30, 2004

(65) Prior Publication Data

US 2006/0013476 A1    Jan. 19, 2006

(51) Int. Cl.
*G06K 9/36* (2006.01)
(52) U.S. Cl. ..................................... 382/232
(58) Field of Classification Search ................ 382/162, 382/166, 232, 233, 235, 240; 348/384.1, 348/400.1; 375/240, 240.01, 240.19; 341/56; 380/40, 200, 277, 278
See application file for complete search history.

(56) References Cited

U.S. PATENT DOCUMENTS

| 6,360,005 | B1 * | 3/2002 | Aloni et al. ................. 382/148 |
| 6,441,867 | B1 * | 8/2002 | Daly ........................... 348/607 |
| 6,778,709 | B1 * | 8/2004 | Taubman ..................... 382/240 |
| 6,907,073 | B2 * | 6/2005 | Sawhney et al. ....... 375/240.14 |
| 7,035,460 | B2 * | 4/2006 | Gallagher et al. ........... 382/167 |
| 7,085,409 | B2 * | 8/2006 | Sawhney et al. ............ 382/154 |
| 7,116,831 | B2 * | 10/2006 | Mukerjee et al. ............ 382/236 |
| 7,215,831 | B2 * | 5/2007 | Altunbasak et al. ......... 382/299 |
| 7,269,257 | B2 * | 9/2007 | Kitaya et al. .................. 380/45 |

* cited by examiner

*Primary Examiner*—Jose L Couso
(74) *Attorney, Agent, or Firm*—MH2 Technology Law Group LLP

(57) ABSTRACT

This invention relates to an imaging device that extends the processing of resources to data having a greater bit-depth. A signal having data at the first bit-depth is received, and at least a portion of the data at the first bit-depth is converted into an estimated value that is at the second bit-depth. A residual that indicates a difference between the data and the estimated value is determined. The estimated value is processed through the resource to form processed data that is at the second bit-depth. The data is then substantially recovered at the first bit-depth from the processed data that is at the second bit-depth and based on the residual.

20 Claims, 3 Drawing Sheets

10-BIT PER PIXEL PROCESSING USING 8-BIT RESOURCES

BACKGROUND

This invention relates to an imaging device. Recent imaging devices can operate on input video signals using color bit-depths that are greater than 8-bits. For example, imaging devices can now operate on color bit-depths of 10-bits, 12-bits, etc. Color depths greater than 8-bits can provide more precise color scanning, and thus, may be desirable for a variety of applications.

However, typical imaging devices generally include resources, such as circuitry and software that were designed for 8-bit color depths. For example, there are many known resources that use 8-bit per pixel imaging. In addition, memories often handle data in increments of 8 bits, such as 8-bit and 16-bit words. As another example, most image editing software applications do not support color depths for each color in excess of 8-bits.

Unfortunately, it is difficult and costly to replace or modify these resources. Therefore, it would be desirable to provide methods and systems that can accommodate a larger color depth with existing resources, such as resources designed for 8-bit color depths.

SUMMARY

In accordance with aspects of the invention, a signal having a first bit-depth is processed based on a resource that uses a second bit-depth that is less than the first bit-depth. A signal having data at the first bit-depth is received and at least a portion of the data at the first bit-depth is converted into an estimated value that is at the second bit-depth. A residual that indicates a difference between the data and the estimated value is determined. The estimated value is processed through the resource to form processed data that is at the second bit-depth. The data is then substantially recovered at the first bit-depth from the processed data that is at the second bit-depth and based on the residual.

In accordance with another aspect, an imaging device is configured to perform operations on data at a first bit-depth using resources that use a lower bit-depth. A sensor is configured to detect a signal from an image. A converter, coupled to the sensor, converts the signal into data at the first bit-depth. At least one processor then receives the data, performs calculations on the data using a set of resources that operate at the lower bit-depth, and substantially recovers data at the first bit-depth from the resources.

Additional features of some embodiments of the invention will be set forth in part in the description which follows, and in part will be obvious from the description, or may be learned by practice of the invention. It is to be understood that both the foregoing general description and the following detailed description are exemplary and explanatory only and are not restrictive of the invention.

BRIEF DESCRIPTION OF THE DRAWINGS

The accompanying drawings, which are incorporated in and constitute a part of this specification, illustrate some exemplary embodiments of the invention and together with the description, may serve to explain the principles of the invention.

DESCRIPTION OF EXEMPLARY EMBODIMENTS

Some embodiments of the present invention provide methods and apparatus that extend the ability of existing resources, such as circuits and software. In particular, methods and apparatus are provided that allow data at a first bit-depth to be processed by resources that operate at a second bit-depth that is lower than the first bit-depth.

Reference will now be made in detail to some embodiments of the invention, which are illustrated in the accompanying drawings. Wherever possible, the same reference numbers will be used throughout the drawings to refer to the same or like parts.

Figure 1:
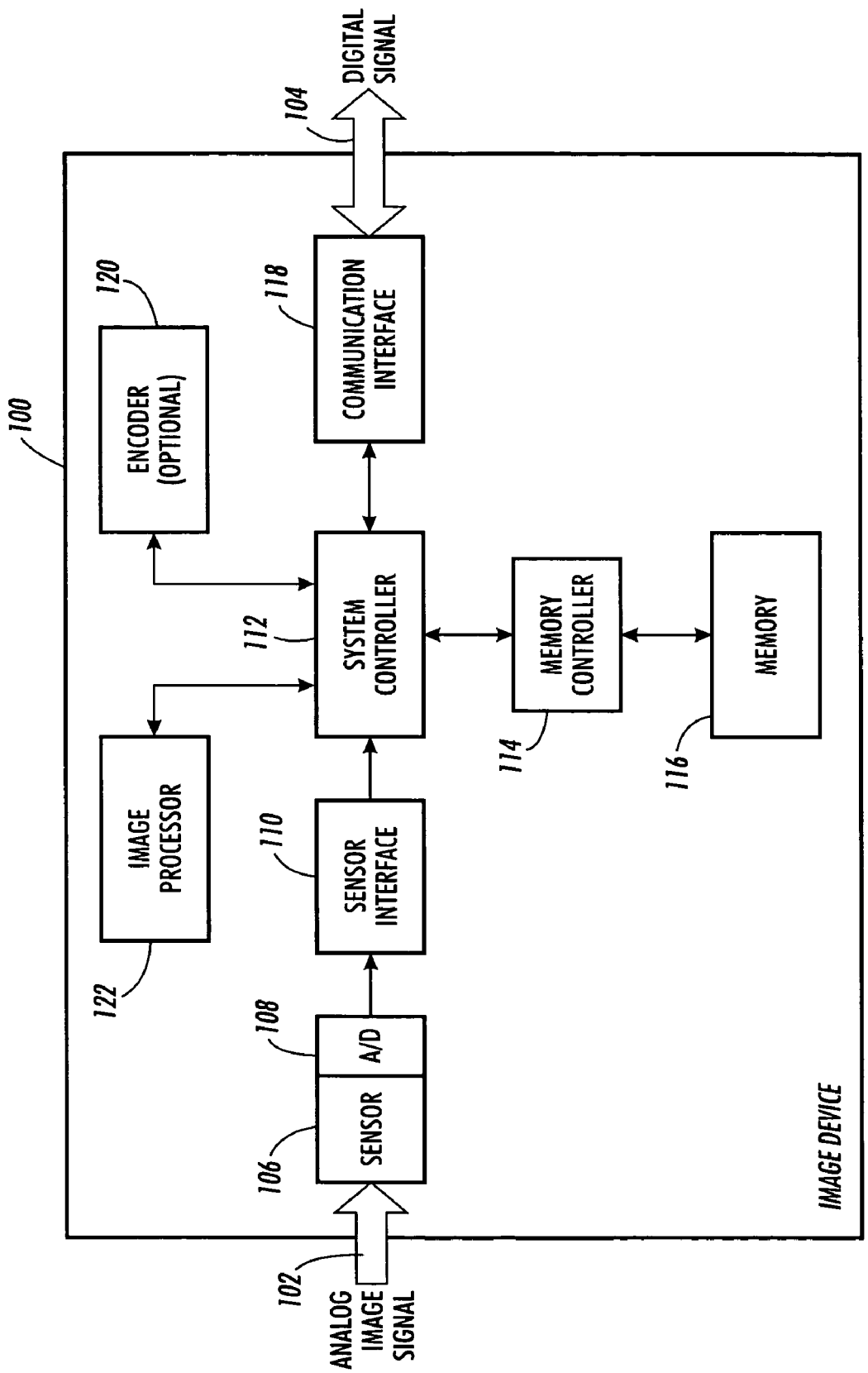
FIG. 1 illustrates an exemplary imaging device that is consistent with the principles of the present invention.

FIG. 1 illustrates an exemplary imaging device 100 that is consistent with the principles of the present invention. Imaging device 100 may be any device that scans and analyzes an image of an object, such as a document or picture. For example, imaging device 100 can be implemented as a flatbed scanner, sheet-fed scanner, handheld scanner, or drum scanner. As shown in FIG. 1, in general, imaging device 100 can receive an analog image signal 102 and convert it into a digital signal 104. For example, analog image signal 102 may be a set of light pulses reflected from an illuminated document (not shown). Imaging device 100 can then capture and analyze this signal and provide digital signal 104 as its output. Digital signal 104 may be any signal that is suitable for communications over any type of medium, such as a universal serial bus (USB) cable, firewire cable, or network medium. Some of the components of device 100 will now be described.

As shown, device 100 may comprise a sensor 106, an analog-to-digital (A/D) converter 108, a sensor interface 110, a system controller 112, a memory controller 114, a memory 116, a communications interface 118, an optional encoder 120, and an image processor 122. One or more of these components may be integrated as a set of chips, such as an integrated circuit, FPGA, ASIC, or system on chip. Alternatively, these components may be coupled together through various types of connections, such as a bus or network. These components will now be further described.

Sensor 106 captures an analog image of an object for imaging device 100. For example, sensor 106 can capture an analog red, green, and blue (RGB) image of a document placed in device 100. Sensor 106 may be implemented using known components. For example, sensor 106 may be a charge coupled device (CCD) array configured to capture analog images. Such sensors and their associated components as well as their equivalents are well known to those skilled in the art.

A/D converter 108 converts the analog image from sensor 106 into a digital signal. For example, for color scans, A/D converter 108 may produce a digital signal output that has a range of bit-depths for each color. Bit-depths may range from 8-bits to 16-bits or more, if desired. For example, A/D converters that produce 24-bit to 48-bit RGB digital color signals (i.e., a bit-depth of 8-bits and 16-bits for each color respectively) are well known. A/D converter 108 may support any bit-depth or other formatting in accordance with the principles of the present invention. A/D converter 108 can be implemented using components that are well known to those skilled in the art.

Sensor interface 110 buffers and sorts the digital values produced by A/D converter 108. Sensor interface 110 may be implemented using components that are well known to those skilled in the art.

System controller 112 controls the communications and interface between the various components of imaging device 100. System controller 112 can be implemented using a combination of hardware and software. For example, system controller 112 can be implemented using one or more field programmable gate arrays (FPGA) or application specific integrated circuits (ASIC). These components and their configuration are well known to those skilled in the art and may be used in various embodiments of the present invention.

Memory controller 114 controls access to memory 116. Memory controller 114 can be implemented using well known components. Memory 116 serves as a storage location for data in imaging device 100. For example, memory 116 may store the digital signal produced from A/D converter 108. In addition, memory 116 may store other types of data, such as program code, software, etc. Memory 116 can be implemented using known types of memory, such as read-only-memory (ROM), flash memory, dynamic read-access-memory (DRAM), and synchronous RAM. Of course, any type of memory may be used by imaging device 100.

Communications interface 118 controls communications between imaging device 100 and other devices. For example, communications interface 118 may be configured as a USB port, firewire port, serial port, or parallel port. In addition, communications interface 118 may be configured as a network port, such as an Ethernet port.

Encoder 120 encodes images into formats that may be used by other devices. For example, encoder 120 may encode the digital data of an image into known formats, such as MPEG, JPEG, GIF, etc. These formats are well known to those skilled in the art. In addition, as indicated, encoder 120 may be optionally included as part of imaging device 100.

Image processor 122 processes the raw digital data from A/D converter 108 into a digital image. For example, image processor 122 may perform a variety of operations, such as resolution interpolation, descreening, de-integrating cavity effect (DeICE), and other types of image correction and enhancement. One skilled in the art will recognize that embodiments of the present invention can incorporate any type of image processing operation. Image processor 122 can be implemented using any combination of hardware and software resources. For example, image processor 122 can be implemented using known types of resources, such as FPGAs or ASICs. In addition, in some embodiments, image processor 122 may be implemented using known types of that operate based on existing bit-depths and bit-depths that are different from the bit-depths used by A/D converter 108. For example, image processor 122 may use resources that operate on an 8-bit depth, while A/D converter 108 may produce digital data that is based on a 10-bit depth for each color (e.g., 30-bit RGB color). One exemplary embodiment of image processor 122 is discussed with reference to FIG. 2.

Figure 2:
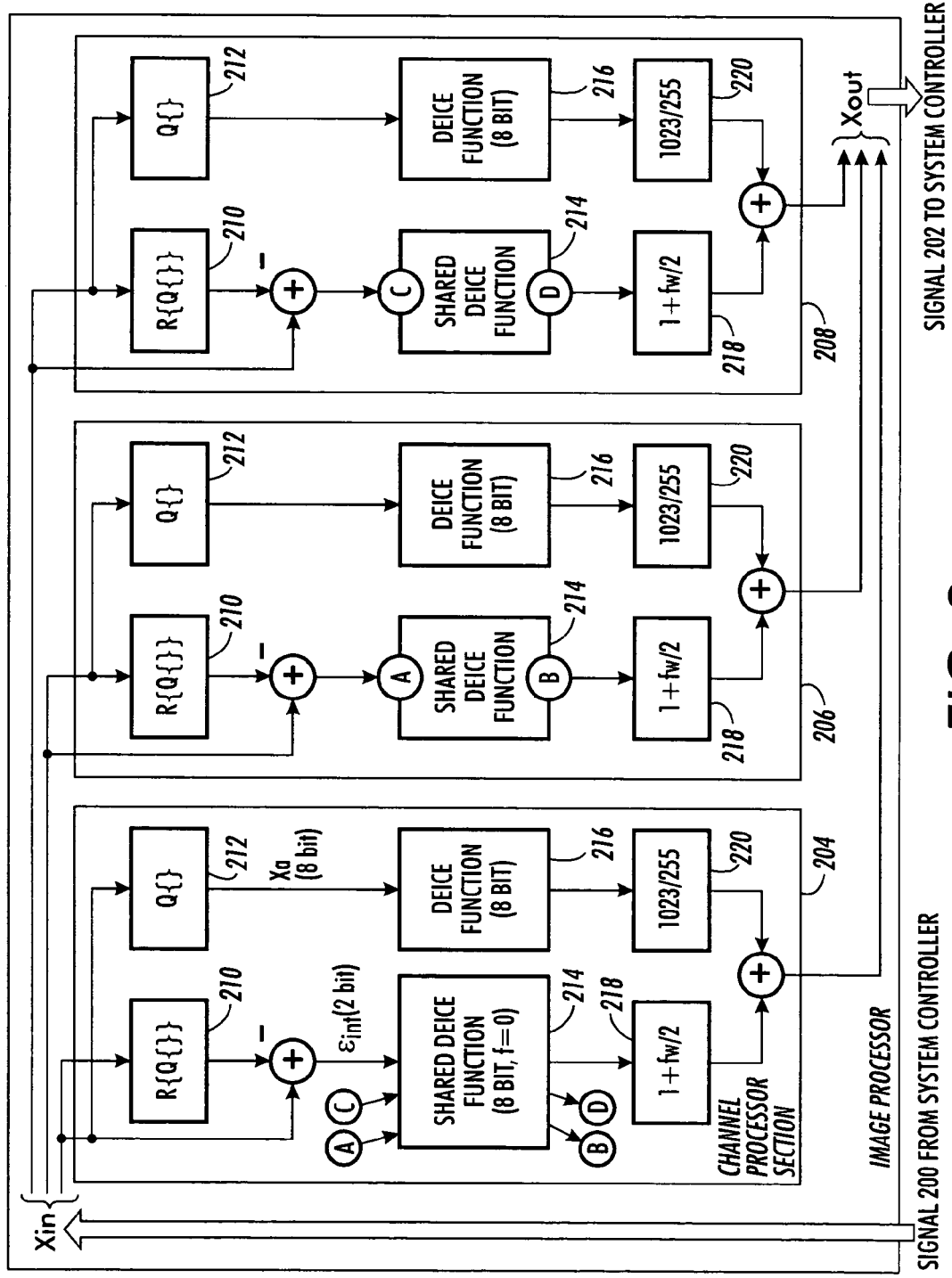
FIG. 2 illustrates an exemplary image processor that is consistent with the principles of the present invention.

FIG. 2 illustrates an exemplary embodiment of image processor 122 that is consistent with the principles of the present invention. One skilled in the art will appreciate that embodiments of the present invention can be configured to perform one or more image processing functions, such as DeICE processing or filtering. The exemplary embodiment shown in FIG. 2 illustrates image processor 122 being configured as a DeICE module that operates on 10-bit color depth data for a three color signal, such as a Red, Green, and Blue (RGB) color signal.

In some embodiments, rather than using 10-bit resources to process 10-bit signals, image processor 122 may comprise 8-bit resources that are configured to substantially equal the performance of 10-bit resources. Before discussing the components and operation of image processor 122, the following description is provided to help explain how embodiments of the present invention may use 8-bit resources to process 10-bit color depth data. The DeICE image processing algorithm is provided as one example of the principles of the present invention.

The DeICE algorithm for a 10-bit color depth signal is known to those skilled in the art and can be represented by equation (1) below.

$$Xout = DeICE\{Xin\} = \left[\frac{(1+fw)}{\left(1+\frac{fx_{in\_avg}}{1023}\right)}\right]Xin \quad (1)$$

In this example, Xout is an output video signal that has a color bit-depth of 10-bits. Of note, a video signal, such as a RGB video signal, may comprise multiple channels. One skilled in the art will recognize that color bit-depth may be expressed on a per-signal or per-channel basis. Therefore, a 30-bit RGB signal is equivalent to a 10-bit per channel signal. Likewise, a 24-bit color signal is equivalent to an 8-bit per channel signal. In this discussion, color bit-depth will be generally expressed on a per channel basis, unless otherwise noted. Of course, the principles of the present invention may be applied to any type or size of bit-depth.

Referring again to equation (1), Xin is an input video signal that also has a color bit-depth of 10-bits. For example, Xin may be derived from one or more channels of the data produced by A/D converter 108. As to the other terms of equation (1), the term "f" is a constant that typically ranges between 0 and 0.5. The term "w" relates to what is known as white point reflectivity. Xin_avg is the average weighted video about a pixel of interest currently being processed by image processor 122.

As noted above, in some embodiments, it may be desirable to implement image processor 122 using pre-existing resources and circuitry, such as 8-bit resources. Accordingly, it may be useful to calculate an 8-bit estimate of Xin.

For purposes of explanation, the term "Xa" will be used to denote an 8-bit estimate of Xin, which is a 10-bit value. Such an estimate, Xa, can be calculated according to equation (2) below.

$$Xa = Q\{Xin\} = \frac{255*Xin}{1023} + \delta, \quad (2)$$

$$\text{where } \delta = \left\lfloor\frac{255*Xin}{1023} + 0.5\right\rfloor - \frac{255*Xin}{1023}$$

The calculation of equation (2) essentially calculates the closest integer 8-bit value of Xa for an original 10-bit value of Xin plus an error factor δ. Therefore, the value of δ ranges between −0.5 and +0.5 in order to round any fractional values of Xin to a nearest integer value of Xa. Combining equations (1) and (2) results in a new equation (3) for Xout as follows.

$$Xout = \left[\frac{1+fw}{1+f(Xa\_avg - \delta avg)/255}\right] * \frac{1023(Xa-\delta)}{255}$$

In some embodiments, since the value of δ ranges from −0.5 to +0.5 and has a mean value of zero, it may be assumed to be small relative to the other terms. Therefore, the value for $\delta_{avg}$ can also be assumed to be small. Therefore, equation (3) can now be rewritten as equation (3a) as follows.

$$Xout \approx \frac{1023}{255} * \left[\frac{(1+fw)*Xa}{1+f(Xa\_avg)/255}\right] - \frac{1023(1+fw)\delta}{255(1+f*Xa\_avg/255)} \quad (3a)$$

Of note, a portion of the first term of equation (3a) is equivalent to an 8-bit DeICE calculation. Therefore the first term of equation (3a) can be rewritten as equation (4) as follows.

$$Xout \approx \frac{1023}{255} * DeICE\{Xa\} - \frac{1023(1+fw)\delta}{255(1+f*Xa\_avg/255)} \quad (4)$$

As to the second term of equation (3a), a solution or estimation for δ is desired. Referring back to equation (2), it is noted that $$Xa = \frac{255*Xin}{1023} + \delta.$$

In order to solve for δ, it is also noted that Xin may be theoretically calculated from Xa (i.e., the 8-bit estimate of Xin) based on equation (5) as follows.

$$Xin = R\{Xa\} + \varepsilon_{int} = \frac{1023*Xa}{255} + \varepsilon_{frac} + \varepsilon_{int} \quad (5)$$

In this equation, $\varepsilon_{int}$ is the integer value used to restore Xin from Xa. In other words, $\varepsilon_{int}$ is the value needed to reconstruct Xin after converting it to an 8-bit value and back to 10 bits. Also in equation (5), $\varepsilon_{frac}$ may correspond to the fraction, such as the smallest possible fraction, to make the output of R{Xa} an integer, e.g., $\varepsilon_{frac}$ may be between −0.5 and +0.5.

By combining equations (2) and (5), δ may therefore be expressed as equation (6) below.

$$\delta = \frac{255}{1023}(\varepsilon_{int} + \varepsilon_{frac}) \quad (6)$$

Based on equation (6), equations (4) and (5) can now be combined into equation (7) as follows.

$$Xout \approx \frac{1023}{255} * DeICE\{Xa\} - \frac{(1+fw)(\varepsilon_{int} + \varepsilon_{frac})}{(1+f*Xa\_avg/255)} \quad (7)$$

Continuing to solve for the second term (now of equation (7), a solution or estimation for $\varepsilon_{frac}$, $\varepsilon_{int}$, and Xa_avg are desired.

In general, $\varepsilon_{frac}$ is a small number, i.e., probably less than one gray scale in significance. Thus, in some embodiments of image processor 122, $\varepsilon_{frac}$ may be ignored. Accordingly, this reduces equation (7) to equation (7a) as follows.

$$Xout \approx \frac{1023}{255} * DeICE\{Xa\} - \frac{(1+fw)(\varepsilon_{int})}{(1+f*Xa\_avg/255)} \quad (7a)$$

As to $\varepsilon_{int}$, its value can be obtained, because it corresponds to the quantization error caused by converting Xin to 8 bits and back again to 10 bits. In other words, $\varepsilon_{int}$=Xin−R{Xa}. As noted above, Xa=Q{Xa}, and thus, $\varepsilon_{int}$=Xin−R{Q{Xa}}. In this form, since R{} and Q{} can be implemented as hardware, $\varepsilon_{int}$ can also be implemented in hardware in some embodiments of image processor 122.

As to Xa_avg, it may be assumed, in some embodiments, that "f" is between 0 and 0.5 and "w" is less than 1. Therefore, based on these assumptions, one possible estimate of equation (7) can be reduced to equation (8) as follows.

$$Xout \approx \frac{1023}{255} * DeICE\{Xa\} - \frac{1+fw}{1+fw/2} * \varepsilon_{int} \quad (8)$$

In various embodiments, depending on what error is to be minimized, other estimates are possible. Other estimates can for formed, for example, by using a different coefficient for $\varepsilon_{int}$ in equation (8). In some embodiments, if it is desired to reduce errors whenever Xin is small, such as to minimize Luminance error, the coefficient of $\varepsilon_{int}$ in equation (8) may be reduced to (1+fw) instead of (1+fw)/(1+fw/2).

Of note, DeICE{}, Xa=Q{Xin}, and $\varepsilon_{int}$=Xin−R{Q{Xa}} can each be implemented in hardware using 8-bit resources. Thus, in some embodiments, image processor 122 may be implemented to perform operations on 10-bit depth data using 8-bit resources.

One skilled in the art will recognize that this methodology can be extended to higher bit-depths. For example, image processor 122 can also be implemented with a 12-bit video path and 8-bit deice modules. Furthermore, other conversions from 8 to 10 bits can be used. For example, 10 to 8 can be accomplished by using the 8 most significant bits of the video, and the error (always positive) then becomes the lower 2 bits. One example of the components that may be implemented in image processor 122 will now be described.

Referring now back to FIG. 2, an exemplary embodiment of image processor 122 is shown that processes a three channel RGB video signal that is 10-bits in depth per channel (i.e., a 30-bit RGB signal). In this embodiment, image processor 122 implements equation (8) noted above in order to perform processing operations on 10-bit data using 8-bit resources. In particular, image processor 122 can receive an RGB video input signal 200 that is 10-bits in depth from system controller 200. Image processor 122 operates on the 10-bit data in each channel of this signal using 8-bit resources that are configured according to equation (8) noted above. Image processor 122 may then return processed data that is 10 bits in depth as output signal 202 back to system controller 112.

For example, as shown in FIG. 2, image processor 122 can include a set of channel processor sections 204, 206, and 208 configured to implement a DeICE function for each channel of RGB input signal 200. That is, channel processor section 204 can process the 10-bit data in the "R" channel, section 206 can process the "G" channel, and section 208 can process the "B" channel. The various components of channel processor sections 204, 206, and 208 will now be further described.

In the embodiment shown in FIG. 2, channel processor sections 204, 206, and 208 are structured similarly. Therefore, the same reference numbers will be used to refer to the same or like components of channel processor sections 204, 206, and 208. In particular, these sections may each include an R-module 210, Q-module 212, a shared DeICE module 214, a DeICE module 216, and coefficient modules 218 and 220.

R-module 210 performs the conversion of an 8-bit value into a 10-bit value. Accordingly, R-module 210 can be implemented as a resource using known types of hardware or software. For example, in some embodiments R-module 210 is implemented in an FPGA.

Q-module 212 estimates an 8-bit value from a 10-bit value. Accordingly, Q-module 212 can also be implemented as a resource using known types of hardware or software. For example, in some embodiments, Q-module 212 is implemented in an FPGA.

Shared DeICE module 214 is a shared module that is common to channel processor sections 204, 206, and 208. In some embodiments, DeICE module 214 uses the same circuitry as DeICE module 216, but is configured to use an "f" value of zero in order to produce $\epsilon_{int}$. As noted above, an 8-bit DeICE function can be represented by equation (9) as follows.

$$DeICE\{Xin\} = \left[\frac{(1 + fw)}{\left(1 + \frac{fx_{in\_avg}}{255}\right)}\right] Xin$$

When "f" is set to zero, the DeICE calculation is reduced essentially to a unit gain multiplier, i.e., DeICE{Xin}=Xin. Image processor 122 may implement shared DeICE module 214 in this manner for a variety of reasons. For example, as noted above, shared DeICE module 214 using a factor of zero does not change any video data, but this allows the processing of image processor 122 for $\epsilon_{int}$ to be easily synchronized with the output of the other 8-bit DeICE module 216.

In addition, in some embodiments, since $\epsilon_{int}$ is generally a small number, image processor 122 may express $\epsilon_{int}$ as a 2-bit value. Since a pre-existing DeICE module can service 8 bits, shared DeICE module 214 can be configured to serve as a delay channel for all 3 channels of an RGB video signal 200, because the $\epsilon_{int}$ for each color only needs two bits of the 8-bit channel. Image processor 122 can therefore be implemented using four 8-bit deice modules (i.e., modules 214 and 216) to perform a 10-bit deice function for all three colors of an RGB video signal.

Accordingly, in some embodiments, shared DeICE module 214 may be configured to distribute respective sets of 2 bits among each of channel processor sections 204, 206, and 208. To illustrate this architecture, FIG. 2 is therefore shown with reference points "A", "B", "C", and "D" to indicate how shared DeICE module 214 is shared among channel processor sections 204, 206, and 208.

DeICE module 216 performs the calculations for the DeICE algorithm, such as noted above in equation (1), for their respective channel processor sections. In some embodiments, DeICE modules 216 can be implemented as an 8-bit resource using known hardware and software. For example, in some embodiments, DeICE module 216 is implemented in an FPGA.

Coefficient modules 218 and 220 perform multiplications operations. Like the other resources of image processor 122, in some embodiments, modules 218 and 220 can be implemented as an 8-bit resource using known hardware and software. For example, in some embodiments, modules 218 and 220 are implemented in an FPGA.

Figure 3:
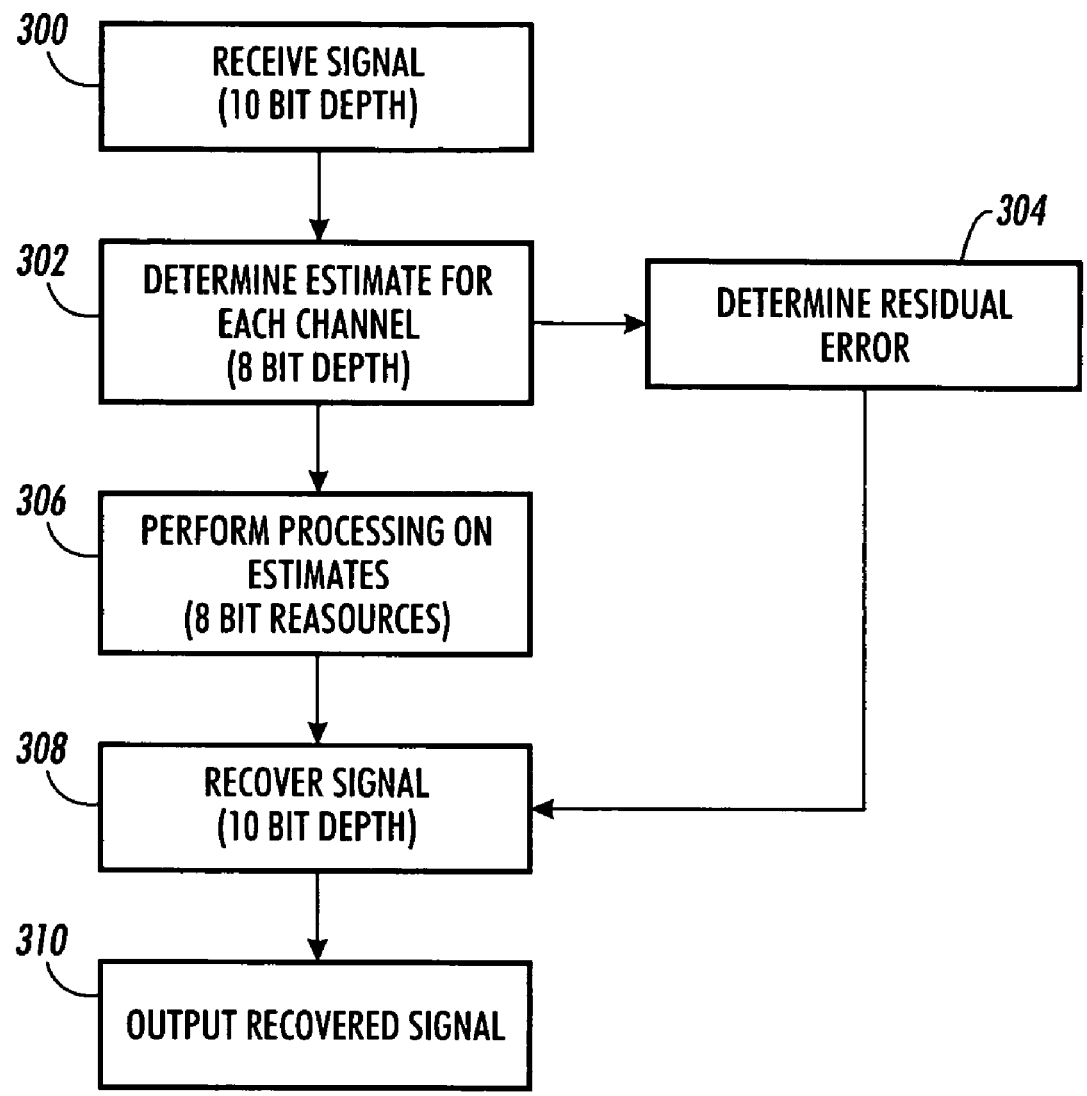
FIG. 3 illustrates an exemplary process flow that is consistent with the principles of the present invention.

FIG. 3 illustrates an exemplary process flow that is consistent with the principles of the present invention. In stage 300, imaging device 100 receives an input signal for an image. For example, imaging device 100 may scan an object, such as a document or picture, by illuminating an input tray (not shown) coupled to imaging device 100. Sensor 106 may then detect light reflected from the object and produce an analog image signal, such as an RGB analog signal. A/D converter 108 may then convert this signal into digital image data. In some embodiments, A/D converter 108 may convert the analog signal into digital image data having bit-depths in excess of 8 bits, such as data having 10-bit or 16-bit color bit-depths (i.e., 30-bit or 48-bit color). This digital image data is then passed to sensor interface 110. Sensor interface 110 sorts and buffers the digital image data and passes it to system controller 112. System controller 112 may then access memory 116 (through memory controller 114) to store this data. System controller 112 may, at a later time, retrieve the digital image data from memory 116 and pass it to image processor 122 for various operations. These operations may be requested by system controller 112 in order to improve the image quality resulting from the digital image data. Processing then flows to stage 302.

In stage 302, image processor 122 receives the digital image data. As noted, in some embodiments, the digital image data has a bit-depth that exceeds 8 bits. Accordingly, image processor 122 calculates an initial 8-bit estimate of the digital image data. For example, image processor 122 may feed channels of the digital image data to respective Q-modules 212 in channel processor sections 204, 206, and 208. Q-modules 212 then calculate the 8-bit estimate, for example, using an 8-bit hardware resource. Processing may then flow to stages 304 and 306.

Although FIG. 3 illustrates these stages in parallel, one skilled in the art will understand that stages 304 and 306 may be performed in other ways, such as in serial fashion. In stage 304, image processor 122 calculates a residual error associated with the 8-bit estimate. As noted above, in some embodiments that are based on various assumptions, this error may be calculated based on the quantization error of converting 10-bit depth values to 8-bit depth values and back again. In particular, in some embodiments, R-module 210 may perform a calculation for converting an 8-bit value into a 10-bit value. Image processor 122 may then sum this result with the 10-bit input data to determine the residual error. For purposes of illustration, this residual error is also noted as $\epsilon_{int}$ in FIG. 2. However, one skilled in the art will recognize that there are algorithms available to calculate a residual error term that is consistent with the principles of the present invention. Processing may then flow to stage 308.

Meanwhile, in stage 306, in parallel to stage 304, image processor 122 performs processing on the 8-bit estimate. For example, modules 218 in image processor 122 can perform 8-bit DeICE operation on this data. Other types of operations and algorithms may also be performed by image processor 122. Processing from this stage may then flow to stage 308.

In stage 308, image processor 122 combines the results from stages 304 and 306 to recover 10-bit depth data from the 8-bit resources. In particular, shared DeICE modules 214 synchronize the residual error $\epsilon_{int}$ with the calculations from DeICE modules 216. In addition, image processor 122 includes coefficient modules 218 and 220 to complete the recovery of the 10-bit depth data. That is, in some embodiments, coefficient modules 218 and 220 can be configured to perform the calculations explained above in equation (8) to complete the recovery of the 10-bit depth data. Processing then flows to stage 310.

In stage 310, image processor 122 outputs the recovered image data. Of note, in some embodiments, the recovered image data is again formatted with a bit-depth that exceeds 8-bits. System controller 112 may then store this recovered data in memory 116, or transmit it to another device through communications interface 118. Alternatively, system controller 112 may pass this recovered data to encoder 120 for additional processing, such as JPEG or MPEG formatting.

It will be apparent to those skilled in the art that various modifications and variations can be made to the exemplary embodiments of the disclosure without departing from the scope of the invention. Other embodiments of the invention will be apparent to those skilled in the art from consideration of the specification and practice of the invention disclosed herein. It is intended that the specification and examples be considered as exemplary only.

What is claimed is:

1. A method of processing a signal having a first bit-depth based on a resource that uses a second bit-depth that is less than the first bit-depth, said method comprising:
   receiving a signal having data at the first bit-depth;
   converting at least a portion of the data at the first bit-depth into an estimated value that is at the second bit-depth;
   determining a residual that indicates a difference between the data and the estimated value;
   processing the estimated value through the resource to form processed data that is at the second bit-depth; and
   substantially recovering the data at the first bit-depth from the processed data that is at the second bit-depth and based on the residual.

2. The method of claim 1, further comprising transmitting the recovered data to at least one other device.

3. The method of claim 1, wherein the second bit-depth is less than the first bit-depth.

4. The method of claim 3, wherein the first bit-depth is 10-bits and the second bit-depth is 8-bits.

5. The method of claim 1, wherein processing the estimated value through the resource comprises performing a DeICE operation on the estimated value.

6. The method of claim 1, wherein processing the estimated value through the resource comprises performing an 8-bit DeICE operation on the estimated value.

7. The method of claim 1, wherein receiving the signal having data at the first bit-depth comprises receiving a multi-channel color signal having a bit-depth of 8-bits per channel.

8. The method of claim 7, wherein receiving the signal having data at the first bit-depth comprises receiving a 24-bit red, green, and blue color signal.

9. An apparatus for processing a signal having a first bit-depth based on a resource that uses a second bit-depth that is less than the first bit-depth, said apparatus comprising:
   means for receiving a signal having data at the first bit-depth;
   means for converting at least a portion of the data at the first bit-depth into an estimated value that is at the second bit-depth;
   means for determining a residual that indicates a difference between the data and the estimated value;
   means for processing the estimated value through the resource to form processed data that is at the second bit-depth; and
   means for substantially recovering the data at the first bit-depth from the processed data that is at the second bit-depth and based on the residual.

10. The apparatus of claim 9, further comprising means for transmitting the recovered data to at least one other device.

11. The apparatus of claim 9, wherein the second bit-depth is less than the first bit-depth.

12. The apparatus of claim 11, wherein the resource is configured to process data at a bit-depth of 8-bits.

13. The apparatus of claim 9, wherein the means for processing the estimated value through the resource comprises a means for performing a DeICE operation on the estimated value.

14. The apparatus of claim 13, wherein the means for processing the estimated value through the resource comprises a means for performing an 8-bit DeICE operation on the estimated value.

15. The apparatus of claim 9, wherein the means for receiving the signal having data at the first bit-depth comprises means for receiving a multi-channel color signal having a bit-depth of B bits per channel.

16. The apparatus of claim 9, wherein the means for receiving the signal having data at the first bit-depth comprises means for receiving a 24-bit red, green, and blue color signal.

17. An imaging device configured to perform operations on data at a first bit-depth using resources that use a lower bit-depth, said imaging device comprising:
   a sensor configured to detect a signal from an image;
   a converter, coupled to the sensor, configured to convert the signal into data at the first bit-depth, the data comprising an estimated value of the signal at a lower bit-depth than the first bit-depth and a residual indicating a difference between the value of the signal at the first bit-depth and the estimated value; and
   at least one processor configured to receive the data, perform calculations on the data using a set of resources that operate at the lower bit-depth, and substantially recover data at the first bit-depth from the resources using the residual.

18. The imaging device of claim 17, further comprising a communications interface that is configured to communicate with at least one other device.

19. The imaging device of claim 17, wherein the at least one processor comprises a set of resources configured to perform 8-bit DeICE operations.

20. The imaging device of claim 17, wherein the at least one processor comprises a set of resources configured to filter the data.

* * * * *